3,262,677
STATOR ASSEMBLY
Melvin Bobo, Topsfield, Robert John Smuland, Reading, and Jack Reid Martin, Bedford, Mass., assignors to General Electric Company, a corporation of New York
Filed Nov. 27, 1963, Ser. No. 326,491
3 Claims. (Cl. 253—78)

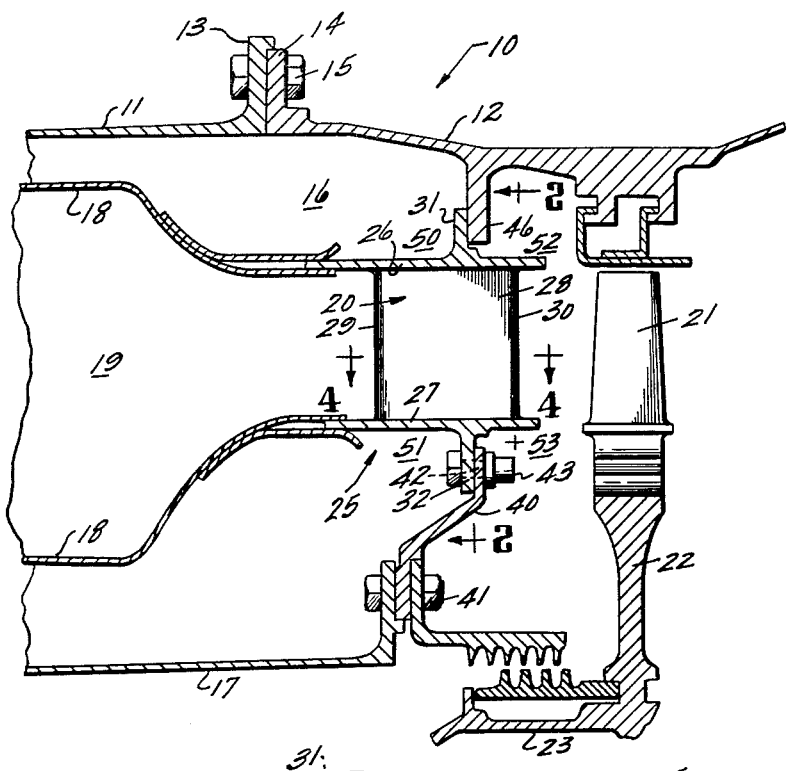

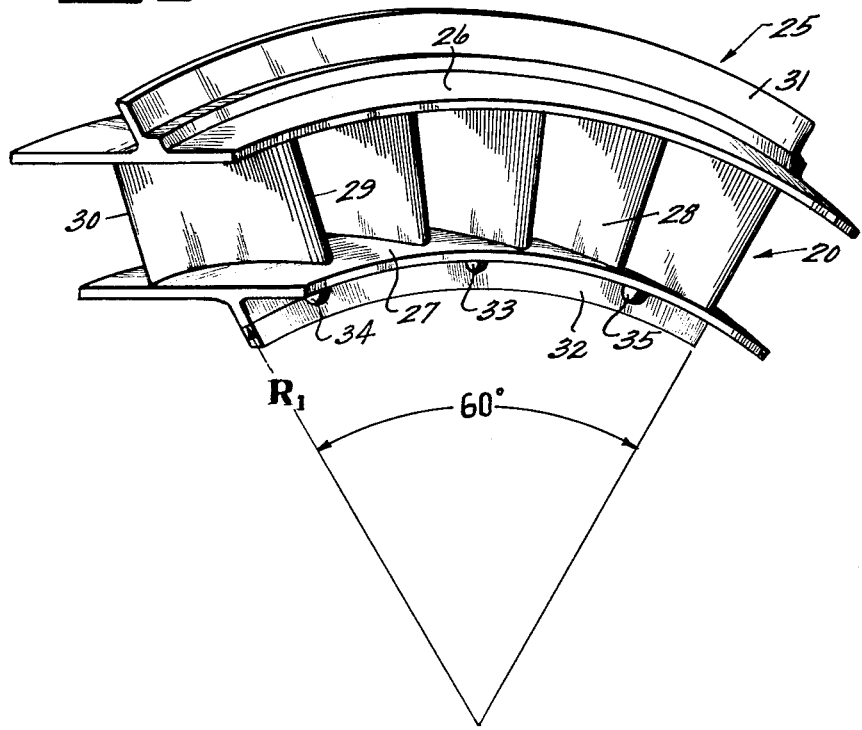
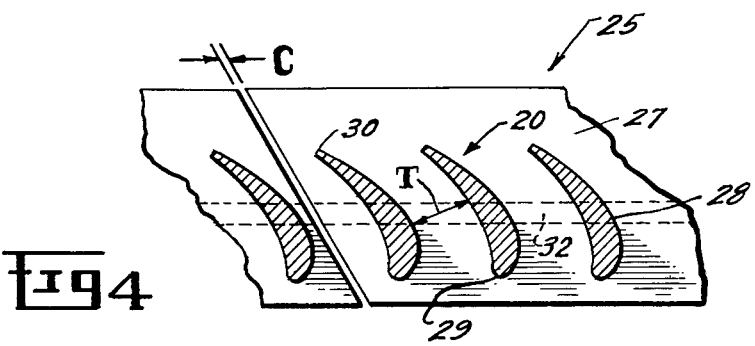
INVENTORS.
MELVIN BOBO
JACK R. MARTIN
ROBERT J. SMULAND
BY George R. Powers
ATTORNEY United States Patent Office 3,262,677
Patented July 26, 1966

This invention relates to stator assemblies for fluid flow machines such as turbines and compressors and, more particularly, to an improved support arrangement for a turbine nozzle diaphragm or other stator assembly subjected to substantial changes in temperature during normal operation.

An annular nozzle diaphragm is conventionally positioned between the combustor and the turbine wheel of a gas turbine engine for directing the high pressure products of combustion to the turbine wheel. The nozzle diaphragm is sometimes a complete integral ring structure formed and supported in the fluid flow machine as an integral unit. In view, however, of the fact that the nozzle diaphragm is customarily subjected to temperatures around 1800° F. and that even greater temperatures may be reached in modern high performance gas turbine engines, the nozzle diaphragm assembly is often segmented and mounted with the segments in circumferentially spaced relationship in order to permit expansion and contraction in response to temperature changes. While the segmenting of the diaphragm results in a significant reduction in the thermal stresses which would otherwise be encountered at these temperatures, it has been found that substantial thermal stresses still occur in areas of high thermal growth, particularly the leading and trailing edges of the airfoil shaped vanes comprising the diaphragm. These stresses can cause cracking or even failure of the nozzle diaphragm if sufficiently severe.

It is therefore a primary object of this invention to provide an improved nozzle diaphragm in which thermal stresses are maintained at a low level, particularly in the leading and trailing edges of the individual vanes.

Another common problem associated with segmented nozzle diaphragms is that leakage can occur between segments and thus reduce efficiency. This problem can be alleviated by use of various types of sealing means to prevent leakage through the circumferential spaces between adjacent segments of the nozzle diaphragm. These solutions are not always entirely satisfactory, however, since the sealing means add to the complexity of the assembly and to the cost of manufacture. In addition, the seals increase the weight of the complete nozzle diaphragm. While this weight increase is not usually great, it is nevertheless undesirable in high performance gas turbine engines used for aircraft propulsion.

It is thus another object of this invention to provide a nozzle diaphragm assembly not requiring the use of sealing means between adjacent segments of the diaphragm.

Another object is to provide an improved nozzle diaphragm having low leakage between adjacent nozzle diaphragm segments, the structure additionally being simple in design and relatively easy and inexpensive to manufacture.

Briefly stated, in accordance with the illustrated embodiment of the invention, a nozzle diaphragm or similar stator structure is formed of a plurality of nozzle diaphragm segments. Each of the segments is comprised of arcuate inner and outer shroud members and a plurality of vanes radially positioned between the shroud members and secured thereto, the shroud members extending circumferentially beyond the end vanes of the segments. Outer and inner circumferentially extending flanges project radially from the outer and inner shroud members, respectively. These radial flanges are axially positioned approximately midway between the leading and trailing edges of the vanes comprising the nozzle assembly. The flanges are thus positioned axially such that they are substantially aligned with the minimum cross sectional areas of the passageways between adjacent ones of the vanes. The combustion products flowing through the nozzle diaphragm have relatively high pressure upstream of this region, which is known as the "throat," and relatively low pressure downstream. The nozzle segments are supported in the turbine by support means which engage the flanges and permit the segments to expand and contract with changes in temperature, the positioning being such that the shroud members expand into abutting relationship at the normal operating temperature of the turbine. The support means overlap the flanges to prevent leakage through the circumferential spaces between the flanges of adjacent segments.

While the specification concludes with claims particularly pointing out and distinctly claiming the subject matter forming the invention, the invention, together with further objects and advantages, may best be understood by reference to the following description taken in conjunction with the accompanying drawing in which:

FIG. 1 illustrates in cross section a portion of the nozzle diaphragm of this invention, the diaphragm being shown mounted in a gas turbine engine;

FIG. 2 is a view, partially cut away, of the nozzle diaphragm of FIG. 1, the view being taken along line 2—2 of FIG. 1;

FIG. 3 is a pictorial illustration of one of the nozzle diaphragm segments; and

FIG. 4 is a view taken along line 4—4 of FIG. 1 which illustrates the positioning of the support flanges relative to the throat areas between adjacent vanes.

Referring first to FIGURE 1, a portion of a gas turbine engine is illustrated, the engine having an outer cylindrical casing 10 comprised of annular sections 11 and 12 secured together at the flanges 13 and 14 by circumferentially spaced bolts 15 as illustrated or by other suitable fastening means. An annular combustion space indicated generally by 16 is defined between the casing 10 and an inner wall 17. The inner wall 17, a stationary member having support capability, may be, for example, an annular flange extending axially from the rear frame of the compressor (not shown). An annular combustion liner 18 is located within the combustion space 16, the liner 18 having suitable openings therein (not shown) through which high pressure air supplied by the compressor to the combustion space 16 can flow to support combustion in the interior 19 of the liner 18.

An annular nozzle diaphragm indicated generally by 20 is located at the aft end of the combustion liner 18 for supplying the hot products of combustion to a row of turbine buckets 21 at the proper velocity and at the proper angle. The nozzle diaphragm 20, along with its construction and mounting, forms the basis of this invention and will be described in detail at a later point in this specification. The turbine buckets 21 are peripherally mounted on a turbine rotor wheel 22 which, along with its associated shaft 23, is rotatably mounted within the casing 10 by suitable mounting means not illustrated. Now that the nozzle diaphragm 20 has been located with respect to the other turbine structure and its general functions with respect to such other structure have been pointed out, the invention itself will be described.

The nozzle diaphragm 20 is comprised of a plurality of segments 25 as shown by FIG. 2, one of the segments being individually illustrated by FIG. 3. Referring now to FIGS. 1–3, each diaphragm segment 25 is comprised of an arcuate outer shroud member 26, an arcuate inner shroud member 27, and a plurality of vanes 28 radially positioned between the shrouds 26 and 27 and secured thereto, the vanes having leading edges 29 and trailing edges 30. A single arcuate circumferentially extending flange 31 projects radially outward from the outer shroud member 26 substantially midway between the leading and trailing edges 29 and 30, respectively, of the vanes 28. A similar single flange 32 projects inwardly from the inner shroud member 27, its axial position also being substantially midway between the leading and trailing edges of the vanes 28. The reason for positioning the flanges 31 and 32 as just described will be discussed in detail at a later point in this specification. Continuing now with the basic description of the individual segments 25, an opening 33 is provided in the flange 32 at the circumferential center of each segment 25, and openings 34 and 35 are circumferentially spaced on opposite sides of the opening 33. If desired, openings 34 and 35 may be made larger than opening 33 as illustrated; the reason for the difference in size will soon become obvious. The segments 25 are formed with the openings 33, 34, and 35 at a definite known radius $R_1$ from the center of curvature of the segments.

Turning now to FIGS. 2–4, each segment 25 of the nozzle diaphragm 20 is formed as a 60° segment by conventional manufacturing techniques. The entire diaphragm may, for example, be either cast or fabricated from sheet metal as a complete integral structure, the diaphragm then being cut to form the individual segments. Alternatively, similar techniques can be used to individually form the segments. It will also be obvious that the nozzle diaphragm 20 may have various numbers of segments 25. For example, the nozzle diaphragm 20 may be comprised of twelve 30° segments instead of the six 60° segments illustrated; it has been found, however, that it is both convenient and practical to use six 60° segments as illustrated. In general, any number of segments may be used so long that the total number of vanes is divisible by that number; this assures that all segments have an equal number of vanes.

Turning back to FIGURES 1 and 2, a support cone 40 is secured to the inner wall 17 by suitable means such as circumferentially spaced bolts 41. The support cone 40 has a series of openings 42 at a radius $R_2$ from the axis of the engine, the circumferential spacing between the openings 42 being the same as the spacing between the openings 33, 34 and 35 of the diaphragm segments 25. The segments 25 are placed in the gas turbine engine with openings 33, 34 and 35 aligned with respective ones of the openings 42. A first bolt 43 is then passed through each opening 33 and the associated opening 42. The bolt 43 and the openings 33 and 42 form a snug fit, i.e., the bolt 43 is said to be "body-bound," so that the circumferential center of the segment 25 is held in a fixed position. Similar bolts 44 and 45 are loosely received in the openings 34 and 35 so that the ends of the diaphragm segments 25 are free to expand and contract circumferentially relative to their fixed centers. The reason for making the openings 34 and 35 larger than opening 33 will now be apparent. If it is desired to make openings 34 and 35 the same size as opening 33, bolts 44 and 45 must be smaller in diameter than bolt 43. If there is a tendency in practice for the segments 25 to pivot about the bolts 43, the openings 33 and 34 may be formed as circumferentially elongated slots instead of circular holes.

With the segments 25 mounted at the radius $R_2$ from the axis of the engine, there is a clearance C between adjacent segments 25 since $R_2$ is greater than $R_1$. The radii $R_1$ and $R_2$ and the clearance C are chosen such that the segments 25 will expand into abutting relationship at the normal operating temperature of the nozzle diaphragm 20. The particular choices of $R_1$, $R_2$, and, therefore, C depend on a number of factors which must be determined with respect to the particular engine on which the nozzle diaphragm 20 is to be used. For example, the particular material from which the nozzle diaphragm segments 25 are formed must be considered since different materials have different coefficients of thermal expansion. The normal operating temperature of the nozzle diaphragm and the temperature at which the segments 25 are assembled must also be considered. Similarly, the amount of expansion of the support cone 40 must also be taken into consideration; this expansion is generally relatively slight since the support cone 40 is subjected to relatively cool compressed air in the space 16 and not to the hot combustion products.

In a particular engine utilizing this invention, the nozzle diaphragm segments were formed to Inco 713C having a coefficient of thermal expansion of $8.15 \times 10^{-6}$. So that the segments 25, assembled at a temperature of 70° F., would abut at the normal operating temperature of 1400° F., $R_1$ was 3.474 inches and $R_2$ was 3.490 inches, thus giving a clearance C of .017 inch between adjacent segments 25.

The supporting arrangement described above locates the circumferential centers of the segments 25 in a fixed position and allows circumferential expansion and contraction of the ends of the diaphragm segments. The support means for locating the nozzle diaphragm 20 axially will now be described. A circumferential flange 46 extends radially inward from the casing 10 at the downstream face of the flanges 31 which extend outwardly from shroud members 26. The high pressure products of combustion entering the nozzle diaphragm 20 hold the flanges 31 in contact with the flange 46. Support cone 40 engaging flanges 32 helps locate the nozzle diaphragm 20 axially.

In the introductory portion of this specification, it was pointed out that certain difficulties are customarily associated with prior art nozzle diaphragms. More particularly, it has been found that substantial thermal stresses occur in areas of high thermal growth, this being particularly true in the leading and trailing edge regions of the vanes comprising the diaphragm. It has also been found that substantial leakage can occur between adjacent segments of a segmented nozzle diaphragm unless separate sealing means are provided. It will now be shown how the structure just described alleviates these difficulties.

Referring now to FIG. 1, it will be observed that while the air within the entire annular combustion space indicated generally by 16 is at a substantially uniform high pressure, the temperature varies greatly within the combustion space 16. The actual combustion process occurs in the interior 19 of the combustion liner 18, and the combustion products supplied from the space 19 to the nozzle diaphragm 20 may be at a temperature of 1800° F. or even higher. The air outside of the combustion liner 18 is at a much lower temperature; this temperature is commonly in the vicinity of 800° F. It will thus be seen that the flanges 31 and 32 will tend to expand less than the remaining portions of the nozzle diaphragm. This will tend to create thermal stresses in the various portions of the nozzle diaphragm. In accordance with this invention, the flanges are positioned in alignment with the throat areas approximately midway between the leading and trailing edges 29 and 30, respectively, of the vanes 28. As a result, the leading and trailing edges, which are the portions of the vanes most adversely affected by the high temperature combustion gases, particularly during starting and shut down transients, can expand and contract without the amount of restraint common in prior art diaphragms where the supporting flanges or similar structure are positioned adjacent either the leading or trailing edges, or both.

The flanges 31 and 32 have been described as being approximately midway between the leading and trailing edges of the vanes 28. Referring now to FIG. 4, it will be shown that in actual practice of the invention the flanges are positioned in alignment with the minimum flow areas between adjacent vanes 28. While the axial position is thus approximately midway between the leading and trailing edges, it can be precisely positioned in accordance with the present invention by determining the position of the minimum flow area or "throat" between adjacent vanes, this area T being shown by FIG. 4. Upstream of the throat T, the combustion products are at a high pressure, and downstream of the throat the combustion products are at a relatively low pressure. The drop in pressure of the combustion gases passing through the nozzle diaphragm occurs almost entirely in the throat area T.

Referring back to FIG. 1, it will thus be obvious that there is relatively little pressure difference between the air in the regions 50 and 51 just outside and inside the outer and inner shroud members 26 and 27, respectively, and the combustion products upstream of the throat. Therefore, in view also of the fact that the diaphragm segments 25 are supported such that clearance C is closed at the normal operating temperature of the nozzle diaphragm 20, little leakage can occur between adjacent segments 25 even in the absence of separate sealing means. It can similarly be seen that very little parasitic leakage can occur between the regions 52 and 53 and the flow area downstream of the throat.

There is, of course, a sizable pressure difference between the high pressure areas 50 and 51 and the adjacent low pressure areas 52 and 53, respectively. In order to prevent leakage between these areas through the circumferential spaces between adjacent flanges 31 and 32, the flange 46 and the support cone 40 overlap the spaces to act as a seal.

It is thus seen that this invention provides a nozzle diaphragm in which thermal stresses are maintained at a low level, particularly in the leading and trailing edges of the individual vanes, and in which separate sealing means are not required for preventing leakage between adjacent nozzle segments.

It will be understood that the invention is not limited to the specific details of the construction and arrangement of the particular embodiment illustrated and disclosed herein. It is therefore intended to cover in the appended claims all such changes and modifications which may occur to those skilled in the art without departing from the true spirit and scope of the invention.

What is claimed as new and desired to secure by Letters Patent of the United States is:

1. Annular stator structure for use in a fluid flow machine comprising:
   an outer annular shroud member,
   an inner concentric shroud member within said outer shroud member,
   a plurality of radially extending vanes positioned between said shroud members and secured thereto,
   adjacent ones of said vanes defining therebetween flow passagesways of varying cross sectional area,
   a single circumferentially extending mounting flange projecting radially outward from said outer shroud member,
   and a single circumferentially extending mounting flange projecting radially inward from said inner shroud member,
   at least one of said shroud members and the flange associated therewith comprised of at least two arcuate segments, the circumferential spacing between said arcuate segments being such that said segments expand into abutting relationship at the normal operating temperature of the fluid flow machine,
   the axial position of the segmented flange being substantially midway between the leading and trailing edges of said vanes such that the flange is in alignment with the minimum cross sectional areas of said passageways between adjacent ones of said vanes,
   whereby radial leakage between the segmented shroud member is substantially prevented and substantially unrestrained expansion and contraction of said leading and trailing edges is permitted.

2. For use in a fluid flow machine, a stator assembly comprising:
   an outer annular member,
   an inner concentric shroud member within said outer shroud member,
   a plurality of radially extending vanes positioned between said shroud members and secured thereto, said vanes having axially spaced leading and trailing edges and defining therebetween flow passageways of varying cross sectional area,
   a single circumferentially extending flange projecting radially outward from said outer shroud member,
   a single circumferentially extending flange projecting radially inward from said inner shroud member,
   at least one of said shroud members and the flange associated therewith comprised of at least two arcuate segments, the circumferential spacing between said arcuate segments being such that said segments expand into abutting relationship at the normal operating temperature of the fluid flow machine,
   the axial position of said flanges being substantially midway between the leading and trailing edges of said vanes such that said flanges are in alignment with the minimum cross sectional area of said passageways between adjacent ones of said vanes,
   and means engaging only said flanges to support said segments in said fluid flow machine,
   whereby radial leakage between the segmented shroud member is substantially prevented and substantially unrestrained expansion and contraction of said leading and trailing edges is permitted.

3. For use in a fluid flow machine, a stator assembly comprising:
   at least two arcuate segments each having an arcuate outer shroud member, an arcuate inner shroud member, and a plurality of radially extending vanes positioned between said shroud members and secured thereto, said vanes having axially spaced leading and trailing edges and defining therebetween flow passageways of varying cross sectional area,
   a single circumferentially extending flange projecting radially outward from each of said outer shroud members,
   a single circumferentially extending flange projecting radially inward from each of said inner shroud members,
   the axial poistion of said outer and inner flanges being substantially midway between the leading and trailing edges of said vanes such that said flanges are in alignment with the minimum cross sectional area of said passageways between adjacent ones of said vanes,
   and means engaging only said flanges to support said segments in said fluid flow machine in circumferentially spaced relationship, the circumferential spacing being such that said segments expand into abutting relationship at the normal operating temperature of the fluid flow machine,
   whereby radial leakage between the arcuate segments is substantially prevented and substantially unrestrained expansion and contraction of said leading and trailing edges is permitted.

References Cited by the Examiner
UNITED STATES PATENTS

| | | | |
|---|---|---|---|
| 2,488,875 | 11/1949 | Morley | 253—78 X |
| 2,510,606 | 6/1950 | Price | 253—78 |

(Other references on following page)

UNITED STATES PATENTS

| | | | |
|---|---|---|---|
| 2,543,355 | 2/1951 | Davis et al. | 253—78 X |
| 2,675,672 | 4/1954 | Schorner. | |
| 2,799,473 | 7/1957 | Smith et al. | 253—78 |
| 2,942,844 | 6/1960 | Neate | 253—78 |
| 2,945,671 | 7/1960 | Petrie | 253—39.1 X |
| 3,142,475 | 7/1964 | Bobo et al. | 253—78 |

FOREIGN PATENTS

| | | |
|---|---|---|
| 1,326,037 | 3/1963 | France. |
| 790,280 | 2/1958 | Great Britain. |

EDGAR W. GEOGHEGAN, *Primary Examiner.*

JULIUS E. WEST, SAMUEL LEVINE, *Examiners.*

E. A. POWELL, JR., *Assistant Examiner.*